Aug. 21, 1928.

C. C. FARMER

BRAKE VALVE DEVICE

Filed July 7, 1926

1,681,575

INVENTOR
CLYDE C. FARMER
BY *Wm. M. Cady*
ATTORNEY

Patented Aug. 21, 1928.

1,681,575

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

BRAKE-VALVE DEVICE.

Application filed July 7, 1926. Serial No. 120,958.

This invention relates to fluid pressure brakes, and more particularly to a brake valve device.

With certain types of brake valve devices, the operating handle is pivoted to the socket portion which fits over the key portion of the rotary valve, and a bail is provided which is adapted to be operated upon a pivotal movement of the handle for supplying sand to the rails.

The brake valve device is provided with a handle guard which prevents removal of the handle except in handle off position and also prevents upward movement of the socket portion.

It has been found that in the normal operation of the brake valve device to control the application and release of the brakes there is a tendency of the operator to press down on the handle. When the handle passes through the handle off position, this downward pressure causes the socket portion to move upwardly, since its movement is not limited by the handle guard in this position, and as a consequence, the further rotary movement of the brake valve is prevented.

In order to obviate the above occurrence, the principal object of my invention is to provide means for preventing the upward movement of the socket portion of the brake valve device in the handle off position.

Figure 1:
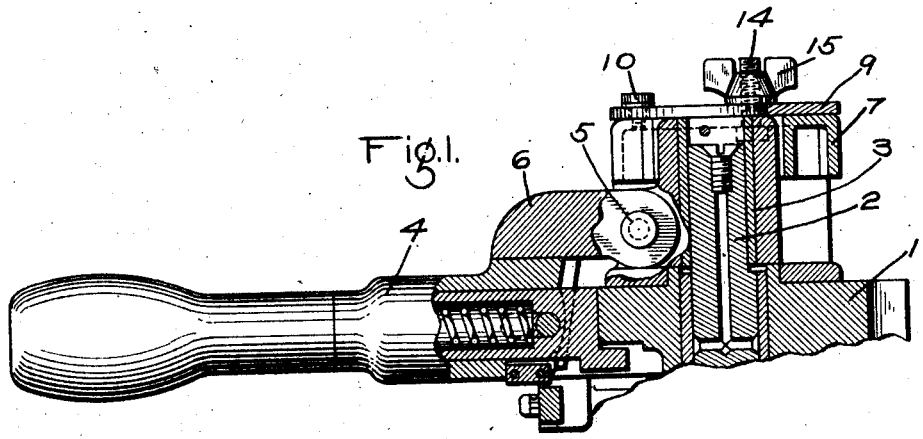

In the accompanying drawing; Fig. 1 is a vertical section on the line 1—1 of Fig. 2, of a brake valve device with my improvement applied; and Fig. 2 a plan view of the brake valve device.

The brake valve device may comprise a body portion 1 having a central opening through which a valve operating key 2 extends. The handle portion may comprise a socket member 3 adapted to be applied to the key 2 and having a handle 4 provided with a slotted end portion connected by a pivot pin 5 to the socket member 3. The member 3 is provided with a lug 6 which extends into the slot of the end portion of the handle and serves as a stop to limit the upward movement of the handle.

Secured to the body portion 1 is a handle guard 7 having an opening 8 for permitting the handle to be removed in the handle off position. In other positions of the handle, the handle guard prevents the handle portion from being removed.

According to my invention, in order to prevent upward movement of the socket member 3 when the handle 4 is depressed, a cover plate 9 is provided. Said plate may be somewhat crescent shaped and is pivotally mounted on the upper face of the handle guard 7 by means of a pivot pin 10 extending through an opening in one end of the plate. The other end of the plate is provided with a slot 11 for receiving a pin 12 which is secured to the handle guard 7.

The plate 9 is also provided with a slot 13, through which extends a threaded pin 14, secured to the handle guard. A thumb nut 15 has screw-threaded engagement on the pin 14 and is provided for the purpose of clamping the plate 9 in position on the handle guard.

Figure 2:
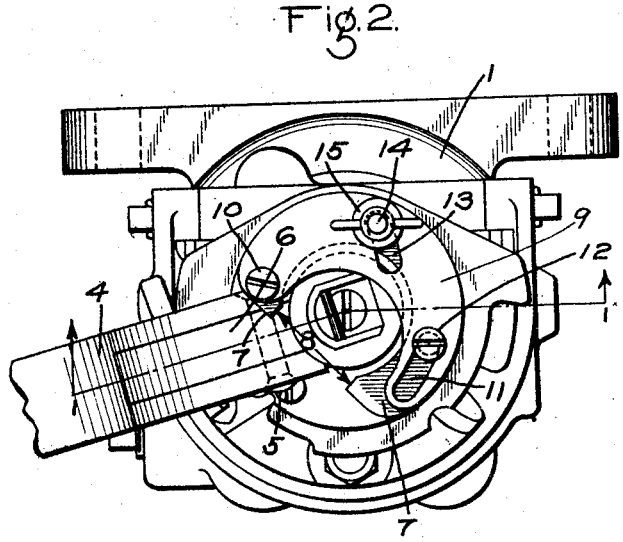

When the plate 9 is clamped in the position shown in Fig. 2, the plate partly extends over top of the socket member 3, so that said plate serves as a stop to prevent upward movement of the socket member 3, if the handle 4 is depressed when the handle is moved through the handle off position.

If it is desired to remove the handle in the handle off position, the thumb screw 15 is loosened, and the plate 9 is swung back on its pivot pin 10, so that the plate will clear the opening, through which the socket member 3 is moved when the handle is to be removed. After the handle is again applied to the key 2, the cover plate 9 is rotated back to the position, as shown in Fig. 2, and the thumb screw is operated to clamp the plate in position against the handle guard 7.

Having now described my invention, what I claim as new and desire to secure by Letters Patent, is:—

1. A brake valve device comprising a body section, a valve operating key, a socket member removably mounted on said key, a handle for operating said member, a handle guard for preventing removal of said socket member and handle except in handle off position, and means for preventing movement of said socket member in the direction of removal when the handle is in the handle off position.

2. A brake valve device comprising a body section, a valve operating key, a socket member removably mounted on said key, a handle for operating said member, a handle guard for preventing removal of said socket member and handle except in handle off position, and a cover plate secured to said handle guard and extending over said socket member.

3. A brake valve device comprising a body section, a valve operating key, a socket member removably mounted on said key, a handle for operating said member, a handle guard for preventing removal of said socket member and handle except in handle off position, a cover plate pivotally secured to said handle guard and having a position in which said plate extends over said socket member, and means for clamping said plate in said position.

In testimony whereof I have hereunto set my hand.

CLYDE C. FARMER.